United States Patent
Karasawa (10) Patent No.: US 6,834,052 B1
(45) Date of Patent: Dec. 21, 2004

(54) BAND MANAGEMENT CIRCUIT

(75) Inventor: Satoru Karasawa, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/487,600

(22) Filed: Jan. 19, 2000

(30) Foreign Application Priority Data

Mar. 10, 1999 (JP) .......................................... 11-063003

(51) Int. Cl.$^7$ ..................... H04L 12/26; H04L 12/28; H04J 3/14; G06F 11/00; G08C 15/00
(52) U.S. Cl. ..................... 370/395; 370/230; 370/358; 370/391; 370/446; 398/2; 398/5; 398/136; 709/220; 709/225
(58) Field of Search ................................ 370/358, 391, 370/395, 398, 399, 400, 409, 422, 535, 413, 427, 431, 452, 503, 474, 449; 709/220, 223, 225

(56) References Cited

U.S. PATENT DOCUMENTS

| | | | | |
|---|---|---|---|---|
| 5,539,564 A | * | 7/1996 | Kumozaki et al. | 359/161 |
| 5,619,495 A | * | 4/1997 | Yamanaka et al. | 370/413 |
| 5,995,810 A | * | 11/1999 | Karasawa | 455/103 |
| 6,091,740 A | * | 7/2000 | Karasawa | 370/458 |
| 6,144,665 A | * | 11/2000 | Karasawa | 370/395 |
| 6,157,645 A | * | 12/2000 | Shobatake | 370/395 |
| 6,160,815 A | * | 12/2000 | Tsuruta | 370/442 |
| 6,285,675 B1 | * | 9/2001 | Sakurai et al. | 370/391 |
| 6,512,771 B1 | * | 1/2003 | Atarashi et al. | 370/395 |

OTHER PUBLICATIONS

"Time Slot Assignment Method for ATM–PDS System", Nakajima and Takigawa, 1993, Fall Meeting of the Institute of Electronics, Information and Communication Engineers of Japan, B–668.

"ATM based Passive Double Star system offering B–ISDN, N–ISDN and POTS", Y. Yakigawa et al., IEEE 1993, pp. 14–18.

* cited by examiner

Primary Examiner—Man U. Phan
(74) Attorney, Agent, or Firm—Venable; James R. Burdett (57) ABSTRACT

The band management circuit of the present invention is utilized in a fiber-optic network that uses, for example, ATM-PDS, in order for an SLT to control the transmissions of a plurality of ONU, which are accommodated by this SLT. The band management circuit of the present invention stores one time in a table an identification number, which specifies a multi-point device for which transmission is authorized. An identification number stored in a table is generated by a table generating portion. The table generating portion sequentially generates the identification number of a number of transmission authorizations determined in accordance with a transmission band provided to respective multi-point devices. A write/read control portion sequentially writes to a table identification number data generated by the table generating portion. In addition, the write/read control portion reads an identification number from a table in accordance with the transmission timing of an ATM cell in which an identification number is to be stored. Outputting an identification number after aligning it one time in a table enables the size and complexity of the circuit to be held in check, and makes it possible to readily change the cycle for outputting an identification number to the outside.

18 Claims, 10 Drawing Sheets

| Switching Order | Read Area | Write Area | Standby Area |
|---|---|---|---|
| ↻ | 211 | 213 | 212 |
| | 212 | 211 | 213 |
| | 213 | 212 | 211 |

FIG. 10

BAND MANAGEMENT CIRCUIT

BACKGROUND OF THE INVENTION

1. Field of the Invention

The present invention relates to a band management circuit, which is used in a 1-to-multiple-connection communication network, for example, in a communication network in which 1 SLT (Subscriber Line Terminal) is connected to a plurality of ONU (Optical Network Units).

2. Description of Related Art

ATM (Asynchronous Transfer Mode)-PDS (Passive Double Star) is well known as one system for constructing a communication network user system. As documentation related to ATM-PDS, for example, there is documentation such as that cited hereinbelow.
(1) Nakajima and Takigawa "Time Slot Assignment Method for ATM-PDS System" 1993, Fall Meeting of the Institute of Electronics, Information and Communication Engineers of Japan, B-668
(2) Y. Takigawa et al "ATM based Passive Double Star system offering B-ISDN, N-ISDN and POTS" IEEE 1993 pp. 14–18

In a fiber-optic network that uses ATM-PDS, 1 SLT is connected to a plurality of ONU by way of 1 SC (Star Coupler). An optical signal sent from the SLT is divided by the SC and transmitted to ONU. Further, optical signals sent from ONU are multiplexed by the SC and transmitted to the SLT.

In sending optical signals from ONU to an SLT, the transmission timing of the plurality of ONU must not overlap. For this reason, ONU transmission timing must be managed by the network. The management thereof is performed by a band management circuit provided inside the SLT. The SLT, in accordance with the control of the band management circuit, sends to an ONU an ATM-PDS cell that indicates transmission authorization. An ONU receives this ATM-PDS cell, determines on its own whether or not transmission authorization has been granted, and performs transmission only when transmission authorization has been granted. When an SLT receives an optical signal from an ONU that has been granted transmission authorization, the band management circuit grants subsequent transmission authorization to the ONU.

In an ATM-PDS system, there is no need for each ONU to have the same transmission band. The band allotted to each ONU is determined by a contract between a subscriber and a communications service. That is, the frequency with which an ONU receives transmission authorization is determined for each ONU in accordance with a contract. A band management circuit separately stores the band of each ONU, and each time determines the ONU, for which transmission is to be authorized in accordance with the band thereof. This is the reason for increasing the size of a band management circuit, and for making the structure thereof more complex. The size and complexity of a band management circuit become more conspicuous the more numerous managed ONU become.

In an ATM-PDS cell, which indicates transmission authorization, there is stored data, for example, an identification number set in each ONU, for identifying an ONU to which authorization has been granted. An ONU, which is targeted for transmission authorization, is specified in accordance with the identification data thereof. As systems for storing this identification data in an ATM-PDS cell, there is a system, which stores only 1 identification data in 1 ATM-PDS cell, and a system, which stores a plurality of identification data in 1 ATM-PDS cell. It is desirable that a band management circuit be capable of handling both systems.

SUMMARY OF THE INVENTION

An object of the present invention is to provide a band management circuit, which has a small circuit size, a simple circuit structure, and is capable of handling a variety of transmission authorization systems.

For this reason, a band management circuit related to the present invention comprises means for forming a table, which stores a plurality of identification data for specifying a terminal device for which transmission is authorized; means for generating the identification data of a transmission authorization number, which is determined in accordance with a transmission band provided to the respective terminal devices; means for writing to the forming means the identification data generated by the generating means; and means for sequentially reading the identification data from the storing means in accordance with a prescribed timing.

A band management circuit related to the present invention arranges identification data in a table, and outputs same to the outside in accordance with a prescribed timing. Consequently, a band management circuit related to the present invention need not be made larger in size or more complex, even when a large number of terminal devices are being managed. In addition, because a band management circuit related to the present invention is able to readily change the cycle for outputting identification data to the outside, this band management circuit can easily handle a variety of transmission authorization systems.

BRIEF DESCRIPTION OF THE DRAWINGS

Other objects and advantages of the present invention are explained below by referring to the accompanying figures.

DESCRIPTION OF THE PREFERRED EMBODIMENTS

Aspects of the embodiments of the present invention will be explained hereinbelow by referring to the figures. In the figures, the size, shape and arrangement relationship of each component element are schematically shown to the extent necessary to be able to understand the present invention, and further, the numerical conditions that will be explained hereinbelow are nothing more than mere examples.

First Embodiment

This embodiment will be explained by taking an example in which the present invention is applied to a communications network in which ATM-PDS is utilized.

Firstly, an example of a communications network to which is applied a band management circuit related to the present invention will be explained using FIG. 1.

Figure 1:
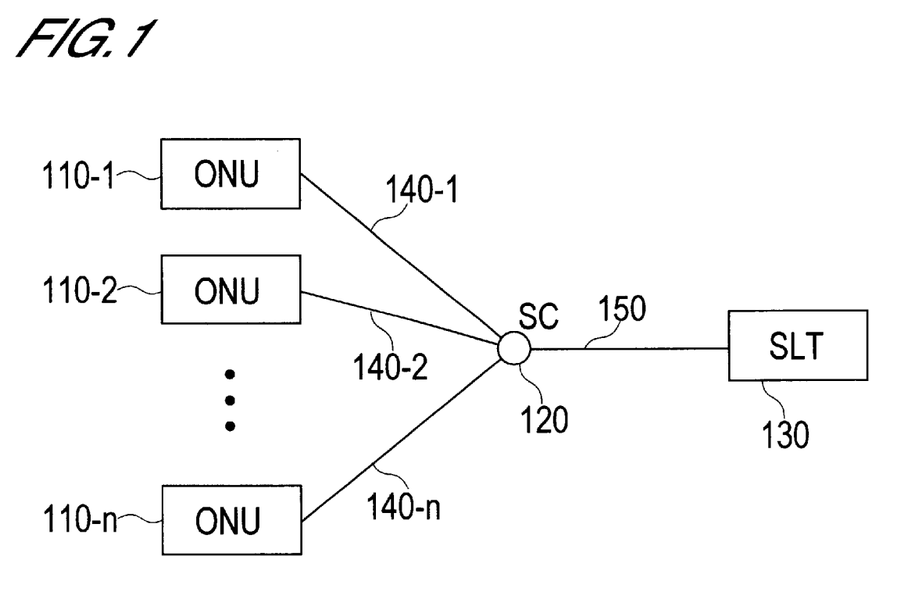
FIG. 1 is a conceptual diagram showing the configuration of a communications network, which is applied to the present invention.

As shown in FIG. 1, a fiber-optic network, which makes use of ATM-PDS, comprises a plurality of ONU (Optical Network Units) 110-1, 110-2, . . . , 110-n, 1 SC (Star Coupler) 120, and 1 SLT (Subscriber Line Terminal) 130. Each ONU 110-1 to 110-nis connected to the SC 120 by an optical fiber 140-1, 140-2, . . . , 140-n. The SC 120 is connected to the SLT 130 by an optical fiber 150.

The ONU 110-1 to 110-nare communications terminals installed in subscribers' homes.

The SC 120 multiplexes and/or divides an optical signal. That is, the SC 120 multiplexes optical signals received from ONU, and sends them to the SLT 130, and divides multiplexed optical signals received from the SLT 130, and sends them to ONU 110-1 to 110-n.

The SLT 130 accommodates ONU 110-1 to 110-n, and carries out communications with these ONU 110-1 to 110-n. The SLT 130 is connected by way of a communications network to communications equipment not shown in the figure, transmits to the communications equipment optical signals received from ONU 110-1 to 110-n, and transmits to ONU 110-1 to 110-noptical signals received from the communications equipment. Inside this SLT 130 is provided a band management circuit of this embodiment. The band management circuit grants transmission authorization to ONU 110-1 to 110-n. ONU 110-1 to 110-ncan transmit optical signals to the SC 120 only when transmission authorization has been granted. In accordance therewith, the overlapping of the transmission timing of a plurality of ONU can be prevented.

The internal constitution of a band management circuit will be explained hereinbelow by using FIG. 2.

Figure 2:
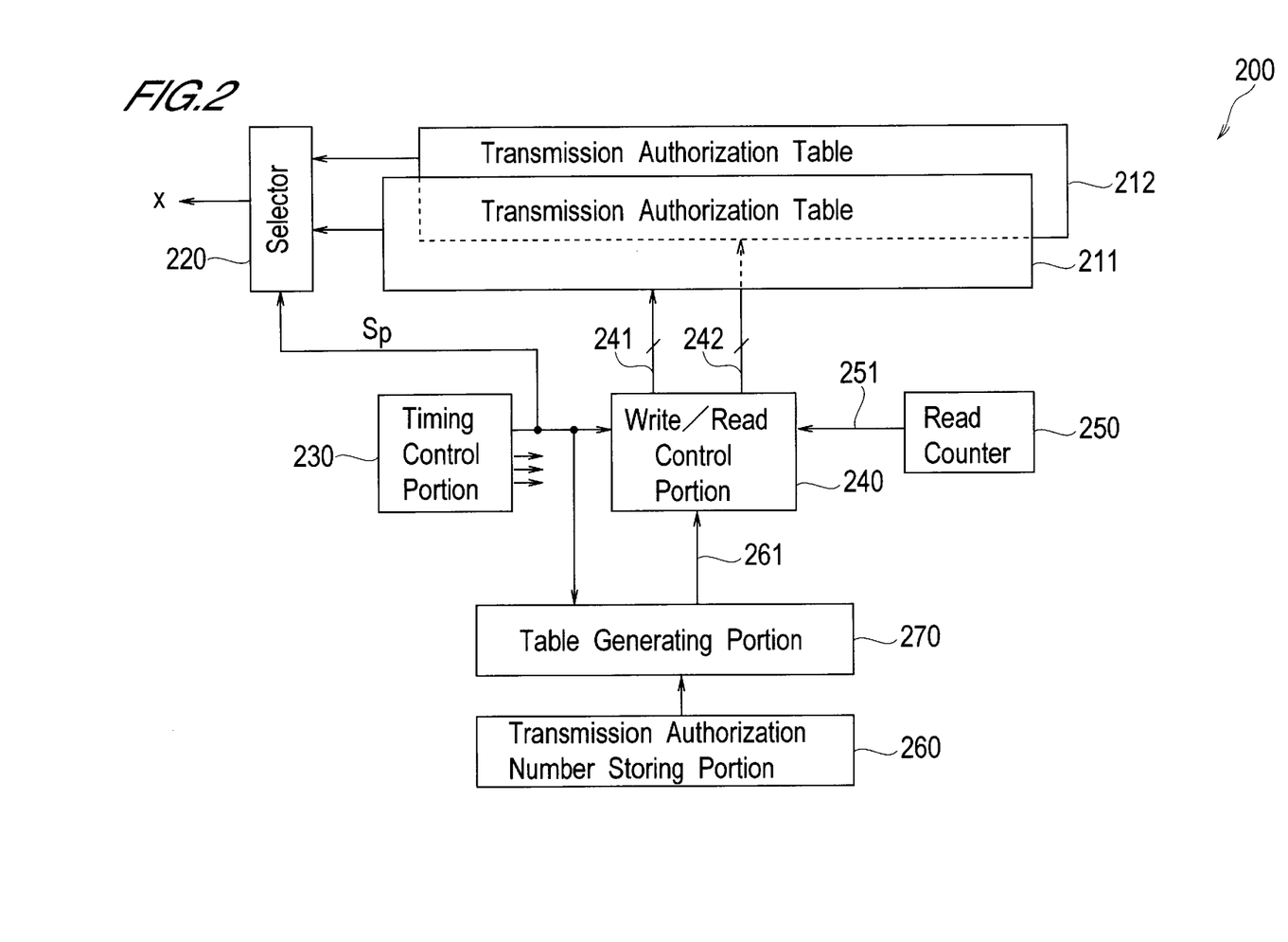
FIG. 2 is a block diagram schematically showing an example of a configuration of a band management circuit related to the present invention.

As shown in FIG. 2, the band management circuit 200 of this embodiment comprises transmission authorization tables 211, 212 constituting 2 areas, a readout data selector 220, a timing control portion 230, a write/read control portion 240, a read address counting portion 250, a transmission authorization number storing portion 260, and a table generating portion 270.

The transmission authorization tables 211, 212 store transmission authorization signals. Tables 211, 212 each have M data storage regions of addresses 0 to M−1. In each data storage region, as explained hereinbelow, there is stored data, that is, an identification number, which identifies an ONU for which transmission is authorized. This identification number constitutes a transmission authorization signal. When an identification number is read out from one of the tables 211, 212, an identification number is written to the other of the tables 211, 212. An identification number is sequentially outputted by sequentially changing the read address from 0 to M−1. In the explanation hereinbelow, of the transmission authorization tables 211, 212, the table from which an identification number is read out is described as the 'read area', and the table to which an identification number is written is described as the 'write area'.

In this embodiment, tables 211, 212 of a 2-area constitution are constituted from 2 single-port RAM (Random Access Memory) chips. But tables 211, 212 can also be realized via other constitutions. For example, tables 211, 212 can also be realized by dividing into 2 the storage region of 1 dual-port RAM chip. Furthermore, tables 211, 212 can also be realized by 2 dual-port RAM chips. When 2 dual-port RAM chips are utilized, one port of each chip is used solely for writing, and the other port is used solely for reading.

The selector 220 inputs a signal from a port of the tables 211, 212. The selector 220 determines the table, which is performing reading, by using an area control signal Sp, which is inputted from the timing control portion. And then, the selector 220 selects and outputs the input data, that is, the identification number, from the table that is performing read out. The identification number outputted from the selector 220 is inserted into an ATM-PDS cell by an insertion circuit not shown in the figure.

The timing control portion 230 generates an area control signal Sp, and another timing signal. The area control signal Sp is, for example, a 1-bit signal, and is a signal that manifests which of tables 211, 212 is the read area and which is the write area. The other timing signal is a signal for providing operational timing to each circuit portion constituting the band management circuit 200. The area control signal Sp and the other timing signal are generated for synchronizing, for example, with an operation of the above-mentioned insertion circuit not shown in the figure.

The area control signal Sp can be generated, for example, using 1 counter and 1 flip-flop. In this example of the constitution, the counter counts the time required for the SLT 130 (Refer to FIG. 1) to output M number of ATM-PDS cells, that is, the M cell period. The flip-flop inverts the output logic every time the count value of the counter reaches an M cell period. This logic is outputted from the timing control portion 230 as an area control signal Sp. In the case thereof, a write and read relative to tables 211, 212 must be performed within an M cell period, that is, the period during which the SLT 130 transmits M number of ATM-PDS cells. That is, the time required for reading M number of identification numbers from the read area must either be the same as an M cell period, or shorter than an M cell period, and the time required for writing M number of identification numbers to the writing area must either be the same as an M cell period, or shorter than an M cell period. The timing control portion 230 generates a timing signal in addition to the area control signal Sp to satisfy this condition.

An area control signal Sp can be generated using a counter and an area switching designation signal inputted from outside of the timing control portion 230. In this example of the constitution, when an area switching designation signal is inputted prior to a count value of the counter reaching an M cell period, when the count value reaches an M cell period, the logical value of the area control signal Sp is switched. On the contrary, when an area switching designation signal is not inputted at the time a count value of the counter reaches an M cell period, the logical value of the area control signal Sp is not switched until an area switching designation signal is inputted. In this example of the constitution, it is possible to write an identification number to the write area without being limited to an M cell period.

The write/read control portion 240 distinguishes between the write area and the read area by inputting an area control signal Sp, and carries out write control for the write area, and carries out read control for the read area.

Figure 3:
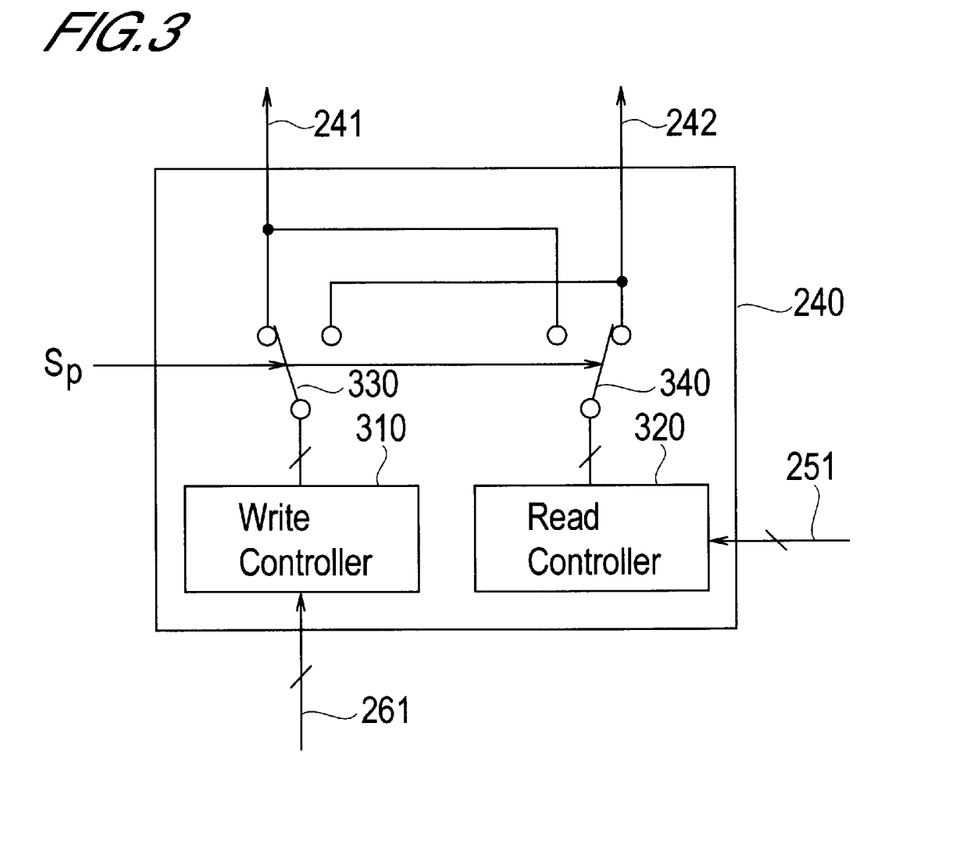
FIG. 3 is an internal block diagram of the write/read control portion shown in FIG. 2.

The write/read control portion 240 can be constituted, for example, as shown in FIG. 3. In FIG. 3, buses 241, 242, respectively, comprise an address bus, a data bus, and a control bus. The control bus comprises a write/read signal line, and an access enable signal line. Bus 241 is connected to table 211, and bus 242 is connected to table 212. Bus switch 330 connects the output of the write controller 310 to one of buses 241, 242 in accordance with the control of the area control signal Sp. Bus switch 340 connects the output of the read controller 320 to the other of buses 241, 242 in accordance with the control of the area control signal Sp.

The write controller 310 is inputted with write data, that is, an identification number, and a write address from the table generating portion 270 by way of bus 261. Furthermore, the write controller 310 outputs over either bus 241 or 242 write data, a write address, and a write/read signal, and makes an access enable signal active by synchronizing same with the change timing of the write address.

The read controller 320 is sequentially inputted with a read address from a read address counter 250 by way of bus 251. Furthermore, the read controller 320 outputs over either bus 241 or 242 a read address, and a write/read signal, and makes an access enable signal active by synchronizing same with the change timing of the read address.

In FIG. 2, the read address counter 250 is a counter for generating a read address. The counter 250 counts cyclically from 0 to M−1. A trigger signal (clock), which starts the count-up of counter 250, is supplied by the timing control portion 230. This trigger signal is generated in synchronization with the operation of the above-mentioned insertion circuit not shown in the figure, that is, the circuit for inserting an identification number into an ATM-PDS cell.

The transmission authorization number storing portion 260 stores identification data and a number of transmission authorizations of ONU, which have established SLT 130 connections. Here, if F represents the line speed from the SLT 130 to ONU 110-1 to 110-n, and mx stands for the band that is allocated to ONU with an identification number of x, then the number of transmission authorizations Nx of the ONU thereof can be given as Nx/M=F/mx. M is the number of identification numbers stored in tables 211, 212.

The table generating portion 270 is inputted with an identification number x and a number of transmission authorizations Nx from the storing portion 260, and generates a write address and write data. In this embodiment, the table generating portion 270 constitutes hardware.

Figure 4:
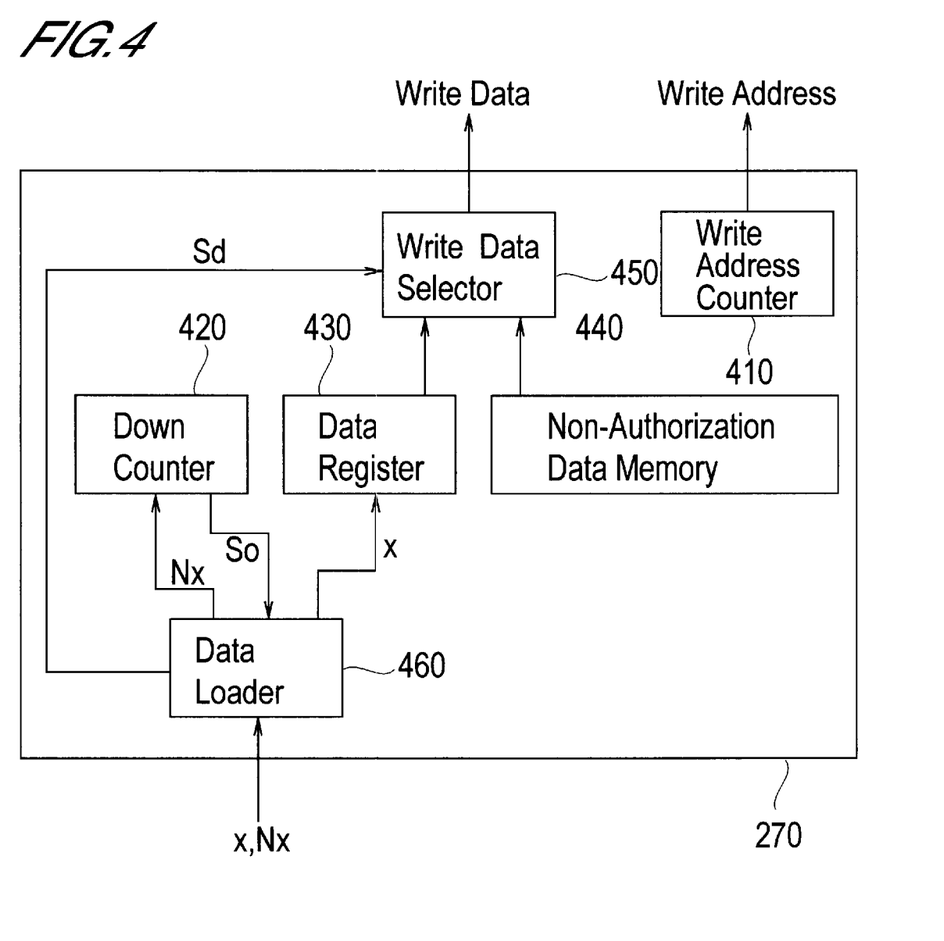
FIG. 4 is an internal block diagram of the table generating portion shown in FIG. 2.

The table generating portion 270, for example, can be constituted as shown in FIG. 4. FIG. 4 is an example in which the table generating portion 270 constitutes hardware.

A write address counter 410 cyclically counts from 0 to M−1 in accordance with a clock (not shown in the figure) inputted from the timing control portion 230. The count value of the counter 410 is sent to the write/read control portion 240 as a write address. The timing at which the count value of the counter 410 constitutes "0" is set so as to correspond to the timing at which the logical value of the area control signal Sp is switched. When the logical value of the area control signal Sp is switched despite the fact that the count value of the counter 410 does not constitute "0," the counter 410 is forcibly reset to "0."

A down counter 420 counts down by ones, having the number of transmission authorizations Nx inputted from a data loader 460 as the initial value. Then, when the count value reaches zero, the down counter 420 outputs a signal S0.

A data register 430 holds an identification number x inputted from the data loader 460.

A non-authorization data memory 440 stores an identification number that does not correspond to any of the ONU 110-1 to 110-n. The identification number stored in data memory 440 is fixed, and need not be rewritten. As explained hereinbelow, even if an identification number read out from memory 440 is transmitted from the SLT 130, transmission authorization is not granted to any of the ONU. That is, an identification number stored in memory 440 is used as a signal, which indicates the non-authorization of transmission.

A write data selector 450 selects either an identification number stored in the data register 430, or an identification number stored in data memory 440, and sends the selected identification number to the write/read control portion 240 as write data. The selection of the data register 430 and data memory 440 is determined by a selection signal Sd.

The data loader 460 stores data in the down counter 420 and data register 430, and generates a selection signal Sd. When the logical value of the area control signal Sp is switched, and the count value of the counter 410 constitutes "0," the data loader 460 is inputted with an initial number of ONU transmission authorizations Nx and an identification number x from the storing portion 260, and stores same in the down counter 420 and the data register 430. Next, using the selection signal Sd, the data loader 460 causes the data selector 450 to select the data register 430. The logical value of the selection signal Sd remains the same until a signal S0 is inputted from the down counter 420. Therefore, the write data selector 450 will continuously output Nx times an identification number x of the same value. When a signal S0 is inputted from the down counter 420, the data loader 460 is inputted with the subsequent number of ONU transmission authorizations Nx and an identification number x, and stores same in the down counter 420 and the data register 430. The data loader 460 causes the data selector 450 to output an identification number x continuously Nx times. The data loader 460 performs the same processing for all ONU that are to be granted transmission authorization. When processing corresponding to the ONU thereof is complete, the data loader 460 switches the logical value of the selection signal Sd so that the data selector 450 will select data memory 440. The data selector 450 repeatedly outputs the identification number stored in data memory 440, that is, the data indicating non-authorization of transmission, until the count value of the counter 410 constitutes "0".

The overall operation of a system related to this embodiment will be explained in detail hereinbelow.

When the timing control portion 230 switches the logical value of the area control signal Sp, the write area and read area are switched. In the following explanation, t0 signifies the timing at which table 211 becomes the new write area, and table 212 becomes the new read area.

As for the write/read control portion 240, at timing t0, the write controller 310 is connected to bus 241 by bus switch 330, and the read controller 320 is connected to bus 242 by bus switch 340.

Table 211 is inputted with an identification number as write data, a write address, a write/read control signal, and an access enable signal from the write/read control portion 240. As explained above, write data and a write address are generated by the table generating portion 270. Write addresses increases 1 at a time from '0' to 'M−1'.

Table 211 sequentially writes inputted write data to each data storage region corresponding to an inputted write address in accordance with an access enable signal. As explained above, the same identification number x is continuously inputted Nx times as the write data. Therefore, the same identification number x is written into a series of Nx number of addresses in table 211. In addition, as explained above, there are cases in which data indicating nonauthorization of transmission is included in the write data.

Table 212 commences input of a read address and an access enable signal from bus 241 at timing t0. As explained above, read addresses increase 1 at a time from '0' to 'M−1'. Table 212 reads an identification number from a data storage region corresponding to each read address, and outputs same to the selector 220 in accordance with an access enable signal.

The selector 220 selects table 212 at timing t0. Then, the selector 220 sequentially sends identification numbers read out from table 212 to an insertion circuit not shown in the figure. This insertion circuit sequentially inserts the identification numbers inputted from the selector 220 into an ATM-PDS cell as transmission authorization signals.

Figure 5A:
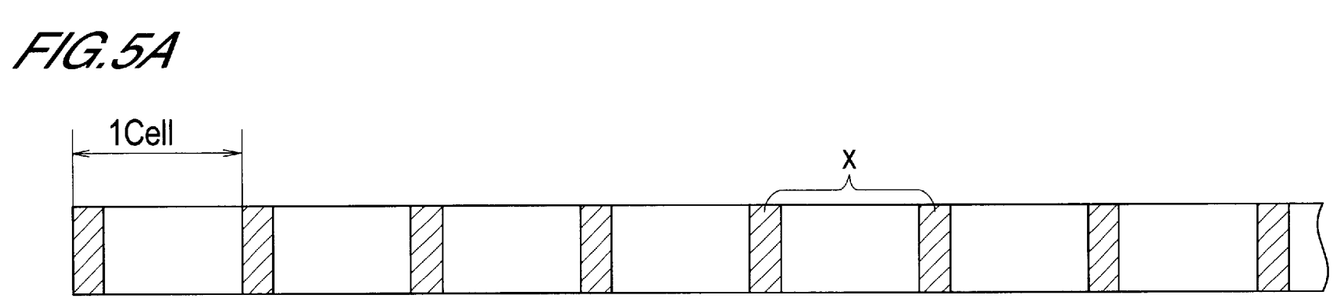
FIGS. 5A and 5B are conceptual diagrams for explaining the procedure for storing in a communication cell data read out from a band management circuit.
Figure 5B:
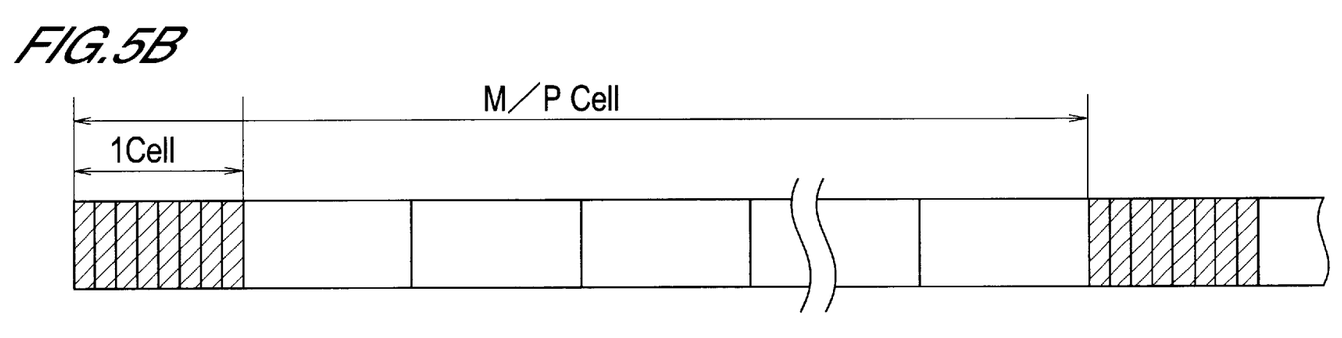

The insertion circuit, as shown in FIG. 5A, can insert 1 transmission authorization signal into 1 ATM-PDS cell, and, as shown in FIG. 5B, the insertion circuit can also insert a plurality of transmission authorization signals into 1 ATM-PDS cell. When 1 transmission authorization signal is inserted into 1 ATM-PDS cell, the cycle at which identification numbers are read out from table 212 is set so as to correspond to the transmission cycle of the ATM-PDS cells. That is, the clock of the counter 250 is set so as to correspond to the cell transmission cycle. Conversely, when a plurality of transmission authorization signals are inserted into 1 ATM-PDS cell, the number P of transmission authorization signals being stored in 1 ATM-PDS cell is determined so that M/P constitutes a natural number. In this case, the cycle at which identification numbers are read out from table 212 is set at 1/P of the ATM-PDS cell transmission cycle. The data write method for tables 211, 212 can be made the same regardless of whether an ATM-PDS cell uses the mode of FIG. 5A, or uses the mode of FIG. 5B.

An ATM-PDS cell into which a transmission authorization signal has been inserted is transmitted from the SLT 130 to the respective ONU 110-1 to 110-n by way of the SC 120 (Refer to FIG. 1). Each ONU 110-1 to 110-n extracts a transmission authorization signal from an ATM-PDS cell. Each ONU 110-1 to 110-n determines whether or not it has been granted transmission authorization by comparing the identification number indicated by a transmission authorization signal against its own internally-stored identification number. When transmission authorization has been granted, each ONU 110-1 to 110-n can transmit to the SLT 130.

In table 212, the same identification number x is written to a series of Nx number of addresses. Therefore, each ONU 110-1 to 110-n receives, either simultaneously or consecutively, Nx number of transmission authorization signals addressed to itself. Each ONU 110-1 to 110-n can perform transmission the same number of times as the number of transmission authorization signals that are addressed to itself.

As explained above, there are cases wherein signals that do not correspond to the identification numbers of any of the ONU 110-1 to 110-n are inserted into an ATM-PDS cell as a transmission authorization signal. In this case, none of the ONU conclude that transmission authorization has been granted to itself. That is, transmission to the SLT 130 is not performed in accordance with this transmission authorization signal.

As explained above, in this embodiment, the storing portion 260 is constituted to store only identification data x and the number of transmission authorizations Nx of ONU with established connections to the SLT 130. Therefore, the table generating portion 270 does not grant transmission authorization to ONU for which a connection is not established. However, the band management circuit can also be constituted so that transmission authorization is granted to either all or a portion of the ONU accommodated by the SLT 130 regardless of whether or not a connection has been established.

The band management circuit 200 of this embodiment is advantageous in that the size of the circuit need not be made larger even when numerous ONU are being managed.

In addition, the band management circuit 200 can alter the insertion cycle of the ATM-PDS cells only by changing the read cycle from tables 211, 212. Therefore, the band management circuit 200 can be utilized in an insertion circuit, which is constituted so as to insert 1 transmission authorization signal in 1 ATM-PDS cell, and can also be utilized in an insertion circuit, which is constituted so as to insert a plurality of transmission authorization signals in 1 ATM-PDS cell.

Second Embodiment

A band management circuit related to this embodiment can be applied to the same network as the network explained in the first embodiment (Refer to FIG. 1).

The constitution of the band management circuit related to this embodiment is the same as the band management circuit of the first embodiment (Refer to FIG. 2), with the exception of the internal constitution of the table generating portion 270. In the band management circuit related to this embodiment, the table generating portion 270 differs from the band management circuit of the first embodiment in that write data generation processing is implemented by software.

This embodiment does not limit the hardware constitution for executing a write data preparation program. Write data preparation processing of this embodiment can be performed using ordinary program execution technology, for example, technology, wherein a program that is stored in ROM (Read Only Memory), is read to working memory (RAM: Random Access Memory) and executed by a CPU (Central Processing Unit). Further, write data preparation processing of this embodiment can also be performed using a DSP (Digital Signal Processor).

In this embodiment, the counter, which generates a write address, can be constituted using hardware, and can also be constituted using software.

Figure 6:
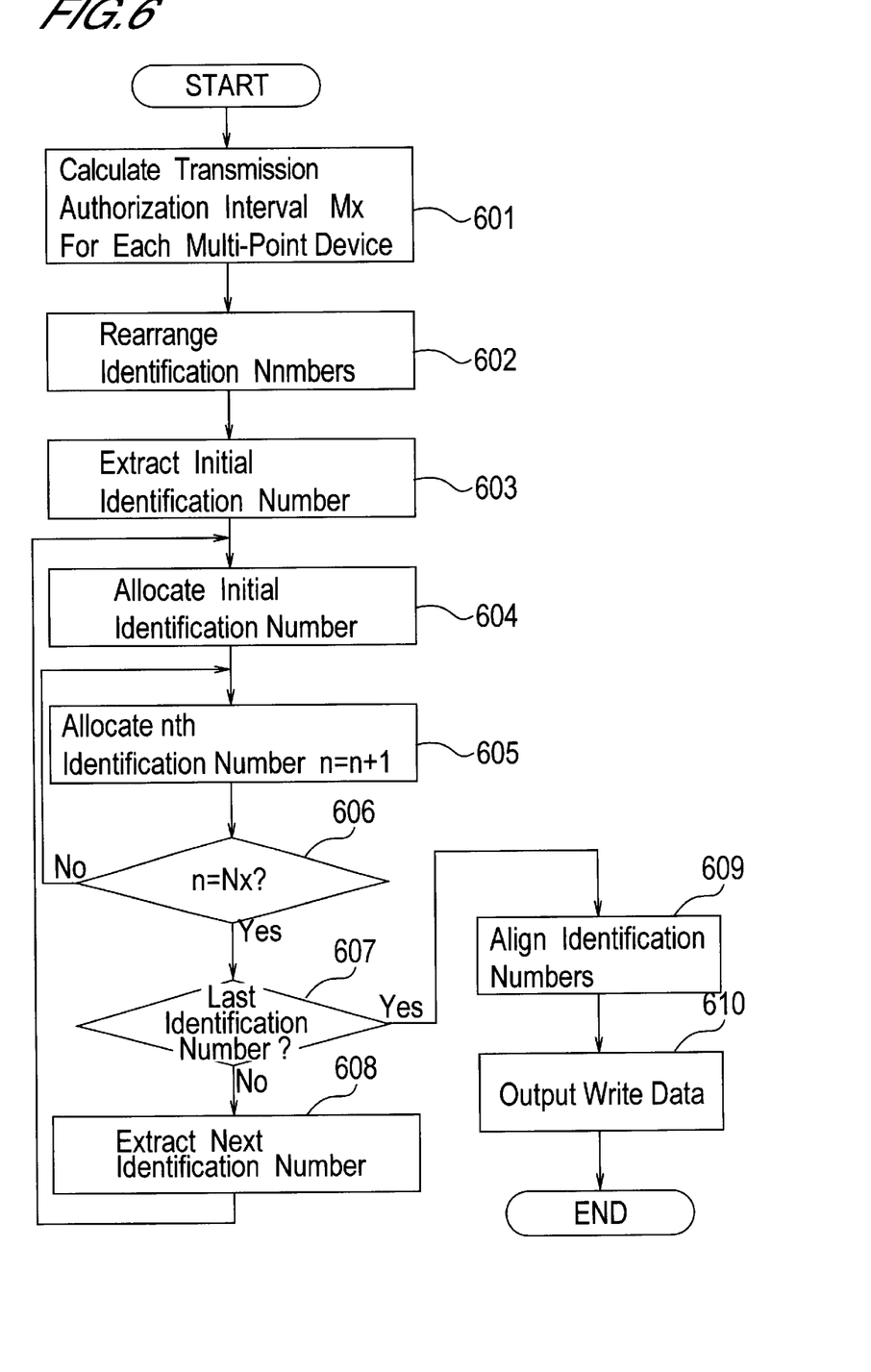
FIG. 6 is a flowchart for explaining the operation of the table generating portion shown in FIG. 2.

Write data preparation processing of this embodiment will be explained hereinbelow by using the flowchart of FIG. 6.

When the table generating portion 270 detects that the logical value of the area control signal Sp has switched, in Step 601, the table generating portion 270 calculates the transmission authorization interval Mx of ONU that are to be granted transmission authorization. Interval Mx is given by M/Nx, where Nx represents the transmission authorization number, and M stands for the number of identification numbers capable of being stored in transmission authorization tables 211, 212. This interval Mx can also be a value, which comprises digits to the right of the decimal point.

In Step 602, the table generating portion 270 rearranges identification numbers x according to corresponding transmission authorization intervals Mx from the smallest to the largest. That is, the identification numbers x are rearranged in order from the largest to the smallest number of transmission authorizations Nx.

Next, the table generating portion 270 prepares a virtual transmission authorization table inside working memory as described hereinbelow. The virtual table has M number of data storage regions. In each data storage region there is stored 1 identification number x.

In Step 603, the table generating portion 270 extracts the initial identification number x. The initial identification number x is the identification number x that corresponds to the smallest transmission authorization interval Mx. Next, after clearing the virtual table, in Step 604, the identification number x is allocated to the address with the smallest value among those addresses to which an identification number has yet to be allocated. In processing relative to the initial identification number x, in Step 604, the identification number x is allocated to the lead address of the virtual table. The lead address of the virtual table corresponds to the lead address of transmission authorization tables 211, 212. In Step 605, the table generating portion 270 uses expression (1) below to calculate a second address to be allocated to the initial identification number x.

The nth address Xn to be allocated to an identification number x is given in expression (1) by making the lead address of the virtual table X0. In Expression (1), [Mx×n−1)] represents the integral part of Mx×(n−1).

$$X0+[Mx \times (n-1)] \qquad (1)$$

In Step 606, the table generating portion 270 checks whether or not the number of addresses that have been allocated to the initial identification number x has reached Nx. When the number of addresses has not reached Nx, processing returns to Step 605, and the subsequent address to be allocated to the initial identification number x is calculated.

In Step 606, when it is determined that the number of addresses has reached Nx, in Step 607, the table generating portion 270 checks whether or not address allocation processing has been completed for all identification numbers x. When it is determined that there exists an identification number x for which processing has not been performed, in Step 608, the table generating portion 270 decides a second identification number x for processing. Next, in Step 604, the table generating portion 270 allocates an identification number x to the address with the smallest value among those addresses to which an identification number has yet to be allocated. The second address of the virtual table is allocated to the second identification number x. Next, in Step 605, the operation of Expression (1) is implemented for the second identification number x, and the calculated address is allocated to this identification number x. In the Step 605 thereof, there are cases in which an address that has already been allocated to the initial identification number x is also allocated to the second identification number x. The problem of a plurality of identification numbers x being allocated to 1 address is solved for in Step 609 explained hereinbelow.

Steps 608, 604, 605, 606 are repeatedly executed until it is determined in Step 607 that address allocation processing has been completed for all identification numbers x.

Figure 7:
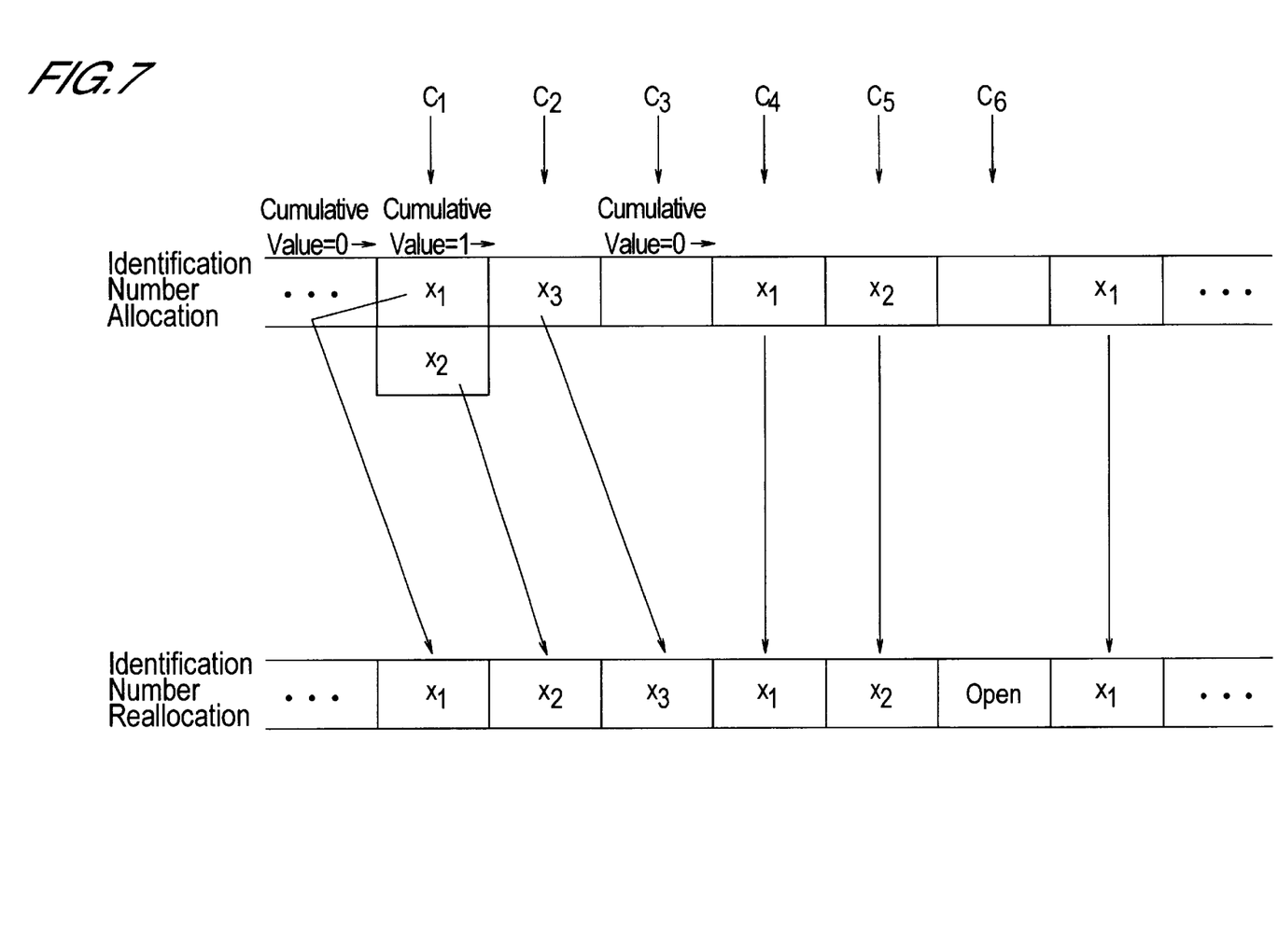
FIG. 7 is a conceptual diagram for explaining the operation of the table generating portion shown in FIG. 2.

In Step 607, when it is determined that processing has been completed, the identification numbers alignment of Step 609 is performed. identification numbers alignment is processing for detecting addresses, to which a plurality of identification numbers x have been allocated, and for performing 'reallocation' to eliminate overlap. FIG. 7 conceptually shows a specific example of the alignment processing thereof.

In this alignment processing, the table generating portion 270 first sets the cumulative value to "0". The cumulative value is the total number of identification numbers x for which 'reallocation' has not been performed. Next, the table generating portion 270, as described hereinbelow, increases and/or decreases the cumulative value while executing 'reallocation' for each address in order from the lead address.

When the cumulative value calculated in processing the immediately-preceding address is "0", the table generating portion 270 carries out processing such as that described hereinbelow for the address being processed at that time.

i) When a plurality of identification numbers x are allocated to an address to be processed, the table generating portion 270 'reallocates' any one of the identification numbers x thereof to this address. In addition, the table generating portion 270 increases the cumulative value by the number of identification numbers x that have not been 'reallocated.' C1 of FIG. 7 is an example, wherein, of the 2 identification numbers x1, x2, identification number x1 is 'reallocated.' In the example of C1, the table generating portion 270 increases the cumulative value by 1.

ii) When only 1 identification number x is allocated to an address to be processed, the table generating portion 270 'reallocates' this identification number x to this address as-is. In this case, the table generating portion 270 does not change the cumulative value. C4 of FIG. 7 is an example, wherein identification number x1 is 'reallocated' as-is, and C5 of FIG. 7 is an example, wherein identification number x2 is 'reallocated' as-is.

iii) When an identification number x has not been allocated to an address to be processed, the table generating portion 270 does not perform 'reallocation.' Therefore, this address is maintained in an 'open' state. The table generating portion 270 does not change the cumulative value in this case, either. C6 of FIG. 7 is an example, wherein 'reallocation' is not performed.

Conversely, when the cumulative value obtained by processing the immediately-preceding address is 1 or more, the table generating portion 270 carries out processing such as that described hereinbelow for the address being processed at that time.

iv) When 1 or a plurality of identification numbers x are allocated to an address to be processed, the table generating portion 270 'reallocates' to this address any identification number x that was not 'reallocated' in preceding processing. The 'reallocation' is not performed for an identification number x allocated to this address before commencing process of this address. In this case, since the total number of identification numbers that have not been 'reallocated' does not change, the table generating portion 270 does not change the cumulative value. C2 of FIG. 7 is an example, wherein the table generating portion 270 'reallocates' identification number x2, which had not been 'reallocated' in immediately-preceding processing C1.

v) Even when an identification number x has not been allocated to an address to be processed, the same as iv) above, the table generating portion 270 'reallocates' to this address any identification number x that was not 'reallocated' in preceding processing. In this case, since the total number of identification numbers that have not been 'reallocated' decreases by 1, the table generating portion 270 decreases the cumulative value by 1. C3 of FIG. 7 is an example, wherein identification number x3, which had not been 'reallocated' in immediately-preceding processing C2 is 'reallocated.'

Completing the alignment processing of Step 609 completes the preparation of a virtual table by the table generating portion 270. Thereafter, in Step 610, the data inside the virtual table is sent to the write/read control portion 240 in accordance with the same procedure as the case of the first embodiment.

The band management circuit of this embodiment, similar to the band management circuit of the first embodiment, is advantageous in that the size of the circuit need not be made larger even when numerous ONU are being managed, and is also advantageous in that the insertion cycle for the ATM-PDS cell can be readily changed.

In addition, when a plurality of transmission authorization signals are sent to 1 ONU, the band management circuit of this embodiment has the advantage of enabling this plurality of transmission authorizations to be broken up and sent without sending same continuously. Breaking up the transmission authorizations enables the data transmissions from the ONU to be broken up. When an ONU transmits image data, or voice data by way of the SLT 130 to communications equipment not shown in the figure, it is desirable to break up the data transmission. When handling image data or voice data, in general, a communications device must process each received data sequentially by providing fixed time intervals. Therefore, when a large volume of image data or voice data is received in a short period of time, a communications device must make use of an internal buffer to temporarily store the data. Consequently, to make effective use of the buffer of a communications device, it is desirable that transmitted data from ONU be broken up. By contrast thereto, when an ONU carries out ordinary data communications with a computer, in general, since it is not necessary for the data to be processed at fixed time intervals, there is no need to break up the transmitted data.

Third Embodiment

A third embodiment will be explained by using FIG. 8 and FIG. 9.

Figure 8:
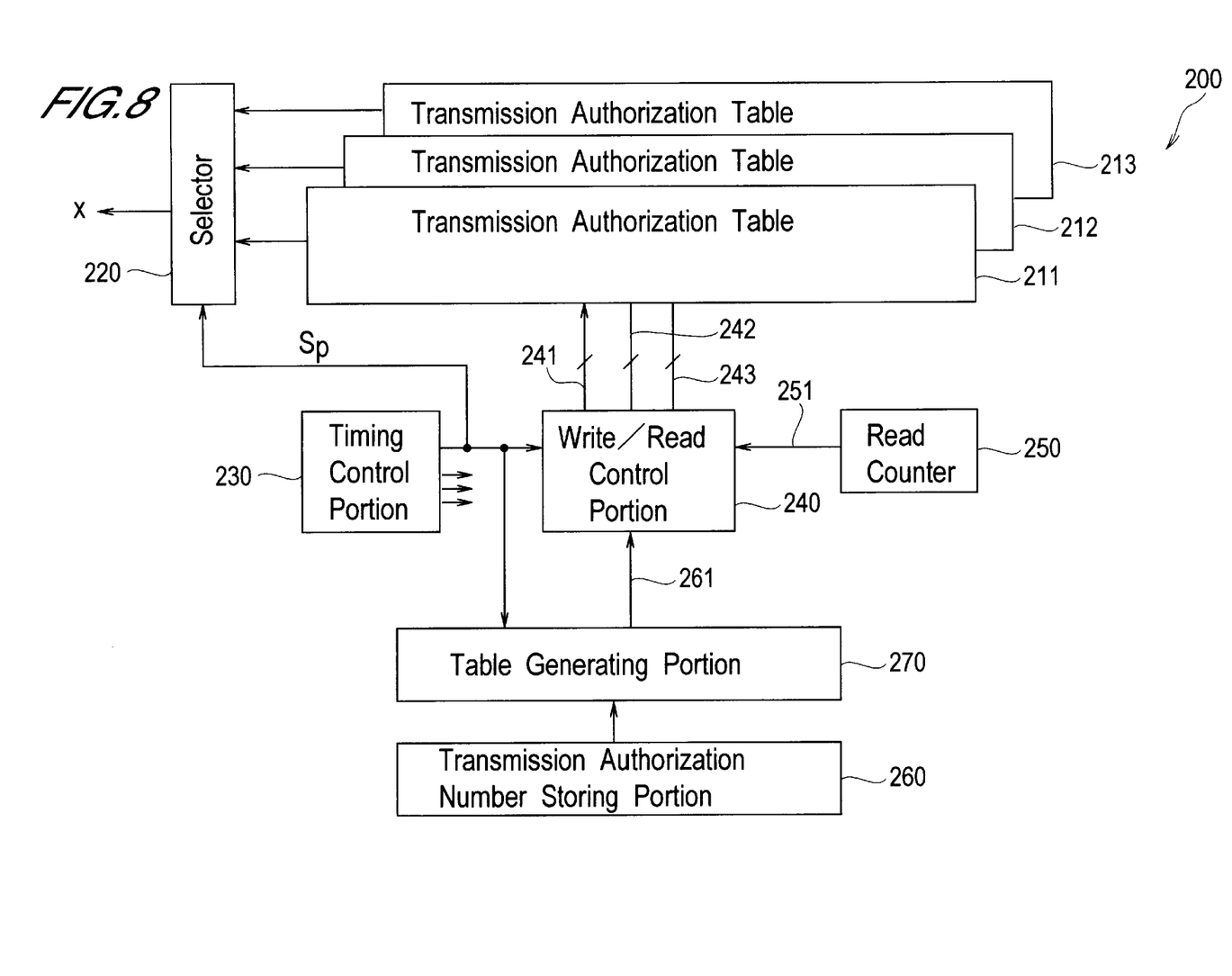
FIG. 8 is a block diagram schematically showing examples of other configurations of band management circuits related to the present invention.

In FIG. 8, component elements assigned the same reference numerals as FIG. 2 are shown, respectively, the same as in FIG. 2.

This embodiment differs from the first embodiment in that it comprises 3 transmission authorization tables 211, 212, 213. These tables 211, 212, 213 function, respectively, as a read area, a write area, and a standby area.

The write/read control portion 240 is constituted so as to perform write control and read control for the 3 tables 211, 212, 213. The write/read control portion 240 and table 213 are connected by bus 243.

Figure 9:
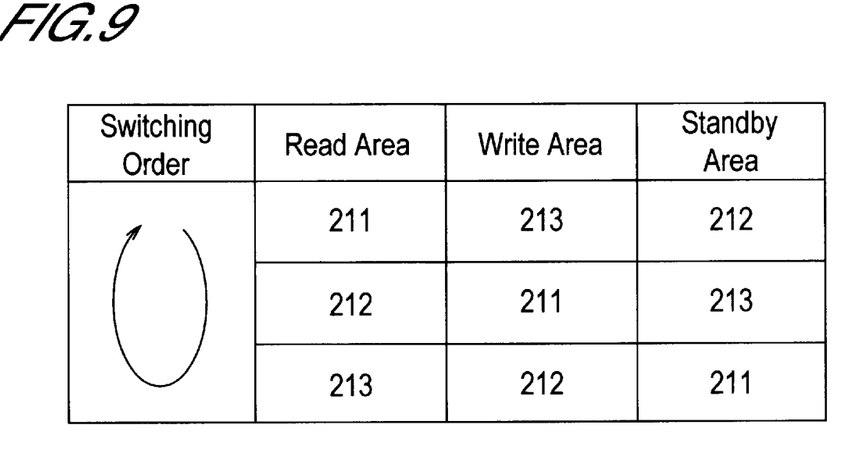
FIG. 9 is a conceptual diagram for explaining the operation of the band management circuit shown in FIG. 8.

The switching of the read area, write area and standby area is executed by the procedure shown in FIG. 9. That is, at nth transmission authorization signal output processing, if it is assumed that table 211 is the read area, table 213 is the write area, and table 212 is the standby area, at n+1th transmission authorization signal output processing, table 212 becomes the read area, table 211 becomes the write area, and table 213 becomes the standby area. Furthermore, at n+2th transmission authorization signal output processing, table 213 becomes the read area, table 212 becomes the write area, and table 211 becomes the standby area.

The band management circuit of this embodiment, similar to the band management circuit of the first embodiment, is advantageous in that the size of the circuit need not be made larger even when numerous ONU are being managed, and is also advantageous in that the insertion cycle for the ATM-PDS cell can be readily changed.

In addition, because the band management circuit of this embodiment provides 3 tables, when the time required to read data from a table and the time required to write data to a table differ, a collision of a read operation and a write operation can be avoided, enabling the band management circuit to operate smoothly.

Fourth Embodiment

A fourth embodiment will be explained by using FIG. 10.

Figure 10:
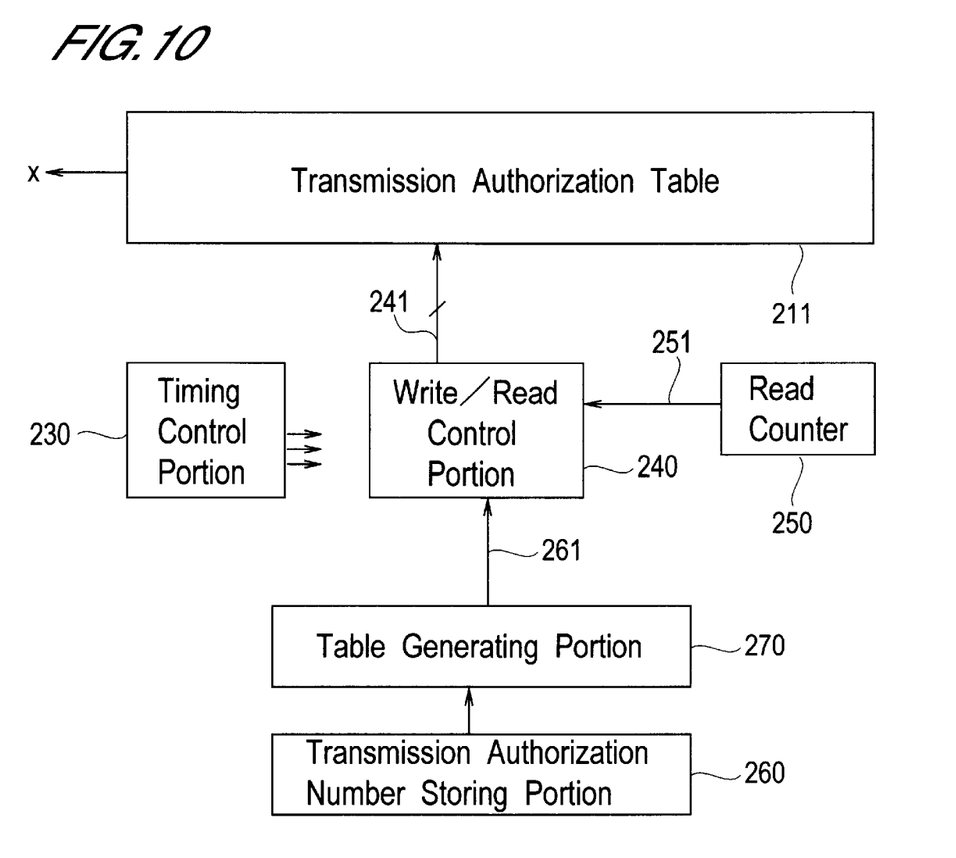
FIG. 10 is a block diagram schematically showing examples of other configurations of band management circuits related to the present invention.

In FIG. 10, component elements assigned the same reference numerals as FIG. 2 are shown, respectively, the same as in FIG. 2.

This embodiment differs from the first embodiment in that it comprises only 1 transmission authorization table 211. That is, 1 table 211 is simultaneously used as a read area and a write area.

The timing control portion 230 controls the operational timing of the write/read control portion 240 so that the phase difference between a read address and a write address is equivalent to around F of the number of data storage regions M of table 211.

The write/read control portion 240 is constituted so that read control and write control are performed alternately for 1 table 211.

The band management circuit of this embodiment, similar to the band management circuit of the first embodiment, is advantageous in that the size of the circuit need not be made larger even when numerous ONU are being managed, and is also advantageous in that the insertion cycle for the ATM-PDS cell can be readily changed.

In addition, because the band management circuit of this embodiment provides 1 table, the memory size can be made smaller.

In each of the above-described embodiments, portions constituted from hardware can all be implemented via software.

Each of the above-described embodiments has been explained using as examples cases in which the present invention was applied to a fiber-optic network that uses ATM-PDS, but so long as a communications network is a one-to-multiple-connections network of a mode, in which a central device grants transmission authorization to multi-point devices, the present invention can be applied to other communications networks as well.

What is claimed is:

1. A band management circuit, comprising:
    a forming portion for forming a plurality of tables, which stores a plurality of identification data for specifying a multi-point device for which transmission is authorized;
    a generating portion for generating said identification data of a same number as a number of transmission authorizations, which is determined in accordance with a transmission band provided to respective said multi-point devices;
    a writing portion for writing to said forming portion said identification data generated by said generating portion;
    a reading portion for sequentially reading said identification data from said forming portion in accordance with a prescribed timing,
    wherein, in parallel to an operation, in which said writing portion writes said identification data to any of said tables, there is executed an operation, in which said reading portion reads said identification data from any other of said tables.

2. The band management circuit according to claim 1, comprising:
    a timing controlling portion for controlling a timing, at which said table that writes data, and said table that reads data are switched.

3. The band management circuit according to claim 1, comprising:
    a read controlling portion for controlling a read cycle of said reading portion based on a control signal inputted from outside.

4. The band management circuit according to claim 1, comprising:
    a write controlling portion for controlling a write cycle of said writing portion based on a control signal inputted from outside.

5. The band management circuit according to claim 1, wherein said forming portion forms 1 table.

6. A band management circuit, comprising:
a forming portion for forming a plurality of tables, which stores a plurality of identification data for specifying a multi-point device for which transmission is authorized;
a generating portion for generating said identification data of a same number as a number of transmission authorizations, which is determined in accordance with a transmission band provided to respective said multi-point devices;
a writing portion for writing to said forming portion said identification data generated by said generating portion;
a reading portion for sequentially reading said identification data from said forming portion in accordance with a prescribed timing,
wherein said generating portion comprises:
an input circuit for sequentially inputting said identification data, and said number of transmission authorizations corresponding to said identification data;
an output circuit for outputting said identification data of a same number as said number of transmission authorizations; and
a transmitting circuit for sequentially transmitting, one pair at a time, said identification data, and a write address corresponding to said identification data.

7. The band management circuit according to claim 6, wherein said generating portion comprises:
a down counter for performing, in accordance with an input clock, a calculation, which makes said number of transmission authorizations an initial value;
a register for holding said identification data;
a memory for storing said identification data, which does not correspond to any of said multi-point devices;
a selector for selecting and outputting one of either a held value of said register, or a stored value of said memory;
an address counter for sequentially generating, in accordance with said input clock, said write address; and
a data loader for repeating control, which stores said number of transmission authorizations and said identification data in said down counter and said register, and control, which causes said selector to select said register until a count value of said down counter constitutes 0, until outputting of all inputted said identification data is complete; and, when outputting of all inputted said identification data is complete, for causing said selector to select said memory until an output value of said address counter makes one round.

8. A band management circuit, comprising:
a forming portion for forming a plurality of tables, which stores a plurality of identification data for specifying a multi-point device for which transmission is authorized;
a generating portion for generating said identification data of a same number as a number of transmission authorizations, which is determined in accordance with a transmission band provided to respective said multi-point devices;
a writing portion for writing to said forming portion said identification data generated by said generating portion;
a reading portion for sequentially reading said identification data from said forming portion in accordance with a prescribed timing,
wherein said generating portion generates said identification data of a number that accords with a transmission band provided to respective said multi-point devices so that the same said identification data is not continuous.

9. The band management circuit according to claim 8, wherein said generating portion calculates a transmission authorization interval in accordance with a transmission band provided to respective said multi-point devices, and generates said identification data so that the same said identification data is broken up in accordance with said transmission authorization interval.

10. The band management circuit according to claim 9, wherein said generating portion comprises:
a calculator for calculating a transmission authorization interval in accordance with a transmission band provided to respective said multi-point devices;
a repeat controller for repeating, for all said identification data, processing, which sequentially aligns said identification data of said number of transmission authorizations on a virtual table in accordance with said transmission authorization interval; and
an arrange controller for arranging said identification data aligned in said virtual table so that a plurality of said identification data are not allocated to one address.

11. The band management circuit according to claim 10, wherein said calculator calculates said transmission authorization interval by dividing the number of data storage regions of said table by said number of transmission authorizations.

12. The band management circuit according to claim 10, wherein said repeat controller executes said alignment processing in order from said identification data for which said transmission authorization interval is small.

13. The band management circuit according to claim 10, wherein said repeat controller determines an initial address to which said identification data will be allocated so that respective said identification data do not overlap with one another.

14. The band management circuit according to claim 10, wherein said arrange controller detects the number of said identification data allocated to each address of said virtual table, and, when a plurality of said identification data have been allocated to 1 address, reallocates to this address any of said identification data, which has been allocated to this address, and reallocates to another address other of said identification data, which have been allocated to this address.

15. The band management circuit according to claim 14, wherein, when a plurality of said identification data have been allocated to an nth address, said arrange controller reallocates to said nth address any of said identification data, which has been allocated to said nth address, and sequentially reallocates to an n+1th, n+2th, . . . address other of said identification data, which have been allocated to said nth address.

16. The band management circuit according to claim 15, wherein said arrange controller comprises functions of:
resetting to 0 a cumulative value of said identification data, for which reallocation has not been performed;
performing processing (i)–(iii) for an address that is to be processed at that time when a cumulative value calculated in processing an immediately-preceding address is "0",
(i) processing, which, when a plurality of said identification data are allocated to an address to be processed, reallocates to this address any one of the identification data thereof, and also increases said cumulative value by the number of said identification data that have not been 'reallocated'

(ii) processing, which, when only 1 of said identification data is allocated to an address to be processed, reallocates this identification data to this address as-is, and does not change said cumulative value (iii) processing, which, when said identification data has not been allocated to an address to be processed, does not perform reallocation, and does not change said cumulative value; and performing processing (iv), (v) for an address that is to be processed at that time when a cumulative value obtained by processing an immediately-preceding address is 1 or more, (iv) processing, which, when 1 or a plurality of said identification data are allocated to an address to be processed, reallocates to this address any of said identification data, which was not reallocated in preceding processing, and does not change said cumulative value (v) processing, which, when said identification data has not been allocated to an address to be processed, reallocates to this address any of said identification data, which was not reallocated in preceding processing, and also decreases said cumulative value by 1.

17. The band management circuit according to claim 1, wherein said forming portion comprises a plurality of single port memories, from which 1 table is formed.

18. The band management circuit according to claim 1, wherein said forming portion comprises either 1 or a plurality of dual port memories, from which 2 tables are formed.

* * * * *